Patented Dec. 6, 1932

1,889,842

UNITED STATES PATENT OFFICE

THOMAS C. PARR, OF SHAKER HEIGHTS, OHIO

COMPOSITION OF MATTER

No Drawing.    Application filed December 8, 1930.    Serial No. 500,879.

My invention pertains to a composition of matter and more particularly to a glazing, or calking mixture of plastic or varyingly viscid consistency as distinguished from paints which are thin enough to be applied with a brush.

I am well aware that the employment of aluminum powder in paints has enjoyed rapidly extending popularity, because its tiny flakes (microscopically viewed) leaf to the surface in a fish scale formation to form a protecting metallic film. I also acknowledge familiarity with the prior patented art including the disclosure of domestic patents to:
Kerr_____ No. 930,482 of Aug. 10, 1909.
Daum_____ No. 1,133,541 of Mar. 30, 1915.
Reimuller___ No. 1,269,116 of June 11, 1918.
Bruno_____ No. 1,341,540 of May 25, 1920.

My invention distinguishes from the use of aluminum powder in paints by reason of my well mixed association of it with a new combination of ingredients, some of which are not indispensible and the percentages of which have varying ranges between feasible limits according to the consistency desired and depending upon the specific use to which my compound is to serve.

The object of this invention is to provide what is practically a permanently elastic and adhesive compound, to be used for glazing, calking and pointing, and which, by reason of forming a metallic coating on the surface, will keep the air, light and heat away from the composition, thus preventing oxidation, volatilizing, or drying out and keeping the composition in a soft plastic condition and thereby giving much longer life and service.
This will result in greater efficiency and great saving of maintenance and upkeep costs, on such buildings as greenhouses, steel and wooden sash, flashings, skylights, or at other places likely to leak in factories, public and private buildings.

The preferred composition of my invention is as follows:

|  | Per cent |
|---|---|
| Whiting (calcium carbonate) | 12.60 |
| Asbestine (magnesium silicate) | 17.10 |
| Asbestos fibre | 5.45 |
| Soya bean oil | 30.63 |
| Varnish | 16.22 |
| Mineral spirits | 9.00 |
| Aluminum (powder or flake) | 9.00 |
|  | 100.00 |

The above percentages by weight.

I have successfully tried other ingredients in place of the first two, such as china clay, titanium, ground shale or slate, silica, barytes, lithopone, fuller's earth, soapstone, marble dust, gypsum, white lead, zinc, and natural combinations of such pigments. Shredded or ground rags, or rope, or other fibrous material may be substituted for the asbestos fibre. Also, the following list of drying, semi-drying and non-drying oils may be substituted, according to intended purpose, for the soya bean oil, namely, linseed oil, perilla oil, cotton seed oil, olive oil, rapeseed oil, corn oil, castor oil, fish oil, rosin oil, raisin oil, sunflower seed oil, paraffin oil, wax oil, tung oil, poppy seed oil, walnut oil, hemp seed oil, maize oil, pine oil, oil soap, indeed, any animal, vegetable and mineral oil alone, and in combination; but none of these equivalent substitutes give as good an effect of mechanical application and durability as the above combination, together with aluminum.

Another formula which I have made and successfully used is:

| 3⅝ lbs. | Calcium carbonate |
|---|---|
| 4¼ lbs. | Magnesium silicate |
| 1 gal. K | Soya bean oil |
| ½ gal. | Mineral spirits |

To six liquid ounces of above compound, add:

1 oz ---- Aluminum flake powder
2 oz ---- Any standard varnish

The whiting and asbestine are near equivalents as pigments and about thirty per cent of either one or both may be employed. Less whiting is needed if more asbestine and more aluminum are used, but the whiting may feasibly be greatly increased to approach seventy-eight per cent for the thickest composition having about the consistency of putty. It is preferable to combine some asbestine with the whiting, because the latter tends to slough off. The asbestine serves as a reinforcement to hold up the oil. The asbestos or other equivalent fibrous material may range between one per cent and twenty per cent; too much of it would retard or even prevent the desirable aluminum flaking to the surface as an oil-protecting film. Enough oil should be mixed to make the entire composition workable according to the requirements of use. For instance, as a comparatively less viscid compound for glazing purposes, application may be by ribbon-like squeezing from a tube whereas, for calking application and compression with a calking knife a heavier consistency is preferable. The varnish hastens and toughens the surface film. The mineral spirits is an added diluent vehicle for cutting to bring to the desired consistency. The varnish and mineral spirits may be replaced in whole, or in part with oil, therefore not indispensible, although desirable. The aluminum powder may range between a fraction of one per cent and perhaps thirty per cent. The more aluminum powder used, the less of either whiting or asbestine, or both will be required.

Compounds heretofore used for glazing, calking and similar sealing purposes have too soon failed to exercise their intended functions, because they dried up and became brittle and hard through oxidation and volatilizing of the carrying vehicle to result in cracking and falling away from joined surfaces. My viscid compound, soon after application, forms a protecting outer surface film including the fish scale aluminum powder formation to encase or seal a certain amount of oily fluid and deter its volatilization, evaporization, or oxidation, thus permitting it to remain in a pliable or elastic condition under the top film to insure a comparative longevity. My composition might be considered as a long lived pliable cement having an enclosing elastic metallic crust of the desired defined shape, but a soft interior of measurable thickness. All the ingredients, except the oil and other vehicles, if any, are mixed as dry powders.

I claim:—

1. A composition of matter comprising about thirty per cent of a pigment, about five per cent asbestos fibre, about nine per cent aluminum, about thirty per cent oil and the balance a volatile diluent vehicle.

2. A composition of matter comprising, 12.6% whiting, 17.1% asbestine, 5.45% asbestos fibre, 30.63% oil, 16.22% varnish, 9% mineral spirits and 9% aluminum powder mixed in proportions to make a plastic mass.

3. A composition of matter of the character described, comprising, from 1–50% of whiting (calcium carbonate) and asbestine (magnesium silicate), from 1–20% of fibrous material, from a fraction of 1%–30% aluminum powder and enough oil to make it workable as a plastic mass.

4. As a new composition of matter, about one-third of pigment, about one-third soya bean oil and the rest fibrous material, aluminum powder and a volatile diluent vehicle.

Signed by me, this 6th day of December, 1930.

THOMAS C. PARR.